United States Patent [19]

Moller

[11] Patent Number: 4,760,374
[45] Date of Patent: Jul. 26, 1988

[54] BOUNDS CHECKER

[75] Inventor: Ole H. Moller, Sunnyvale, Calif.

[73] Assignee: Advanced Micro Devices, Inc., Sunnyvale, Calif.

[21] Appl. No.: 676,362

[22] Filed: Nov. 29, 1984

[51] Int. Cl.[4] .............................. G06F 7/02
[52] U.S. Cl. .................................. 340/146.2
[58] Field of Search .................. 340/146.2, 825.3; 364/900 MS File, 200 MS File

[56] References Cited

U.S. PATENT DOCUMENTS

| | | | |
|---|---|---|---|
| 3,487,364 | 12/1969 | Deeg | 340/146.2 |
| 3,601,804 | 8/1971 | Wainwright | 340/146.2 |
| 3,757,298 | 9/1973 | Turnbush | 340/146.2 |
| 3,845,465 | 10/1974 | Hosick et al. | 340/146.2 |
| 3,931,612 | 1/1976 | Stevens et al. | 340/146.2 X |
| 4,205,302 | 5/1980 | Godo | 340/146.2 |
| 4,382,179 | 5/1983 | Penton | 364/200 |
| 4,495,565 | 1/1985 | Thompson | 364/200 |
| 4,584,666 | 4/1986 | Zolnowsky et al. | 364/200 |

OTHER PUBLICATIONS

PAL "*Programmable Array Logic Handbook*", Monolithic Memories, pp. 5-60-5-66, 1977.
Hanna, "*Associative Comparator*", IBM Tech. Discl. Bull., vol. 25, No. 4, Sep. 1982, pp. 1871-1873.

Primary Examiner—Gary V. Harkcom
Assistant Examiner—Tan V. Mai
Attorney, Agent, or Firm—Patrick T. King; Kenneth B. Salomon; J. Vincent Tortolano

[57] ABSTRACT

A bounds checker consisting of a pair of comparators that each compare a 16-bit number with a lower and an upper limit stored in registers. The device is preferably constructed as a single integrated circuit chip employing emitter coupled logic (ECL) circuitry and can be made externally compatible with either transistor transistor logic (TTL) circuitry or ECL circuitry. The device can be cascaded to operate on extended-precision numbers and has a pin which can be used to select comparison of numbers either as signed two's complement numbers or as unsigned numbers. No added gate delay is imposed by the device's ability to operate either type of number.

7 Claims, 3 Drawing Sheets

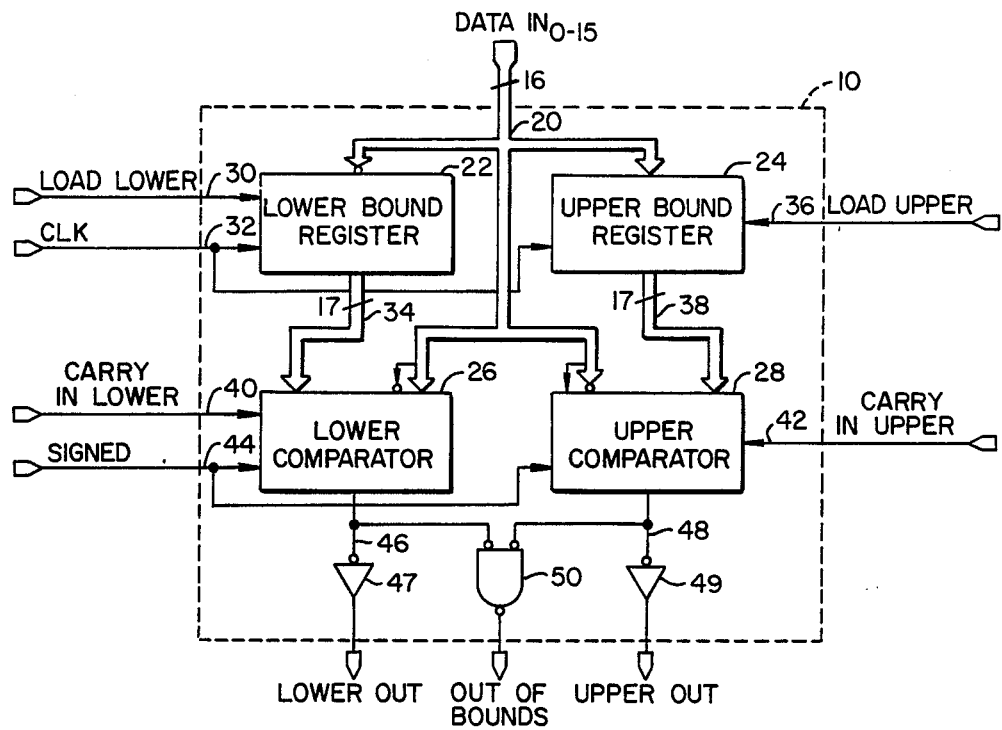
FIG._1.
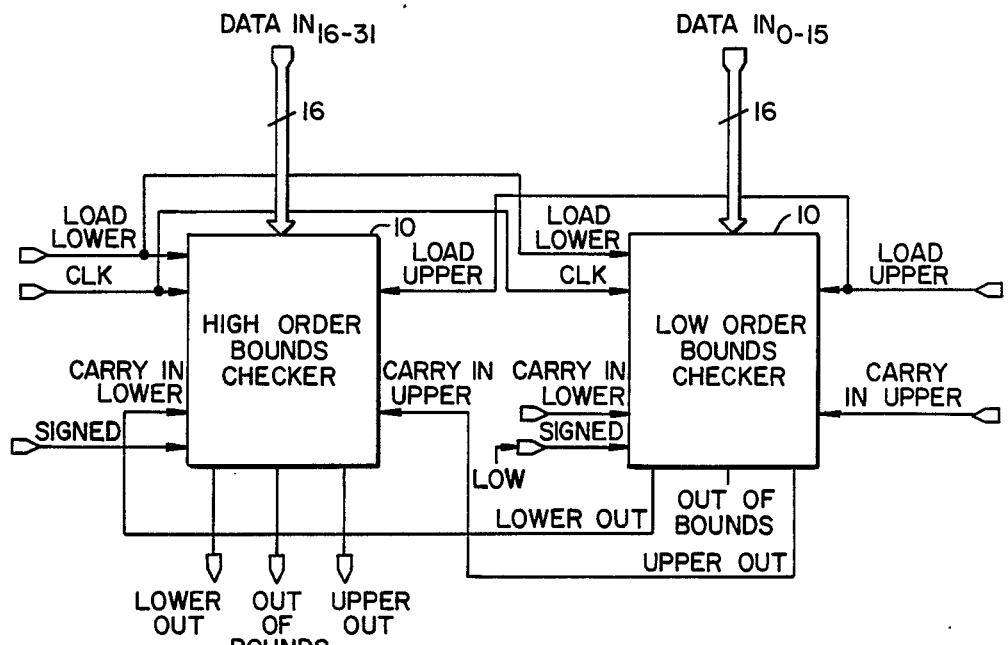
FIG._3.

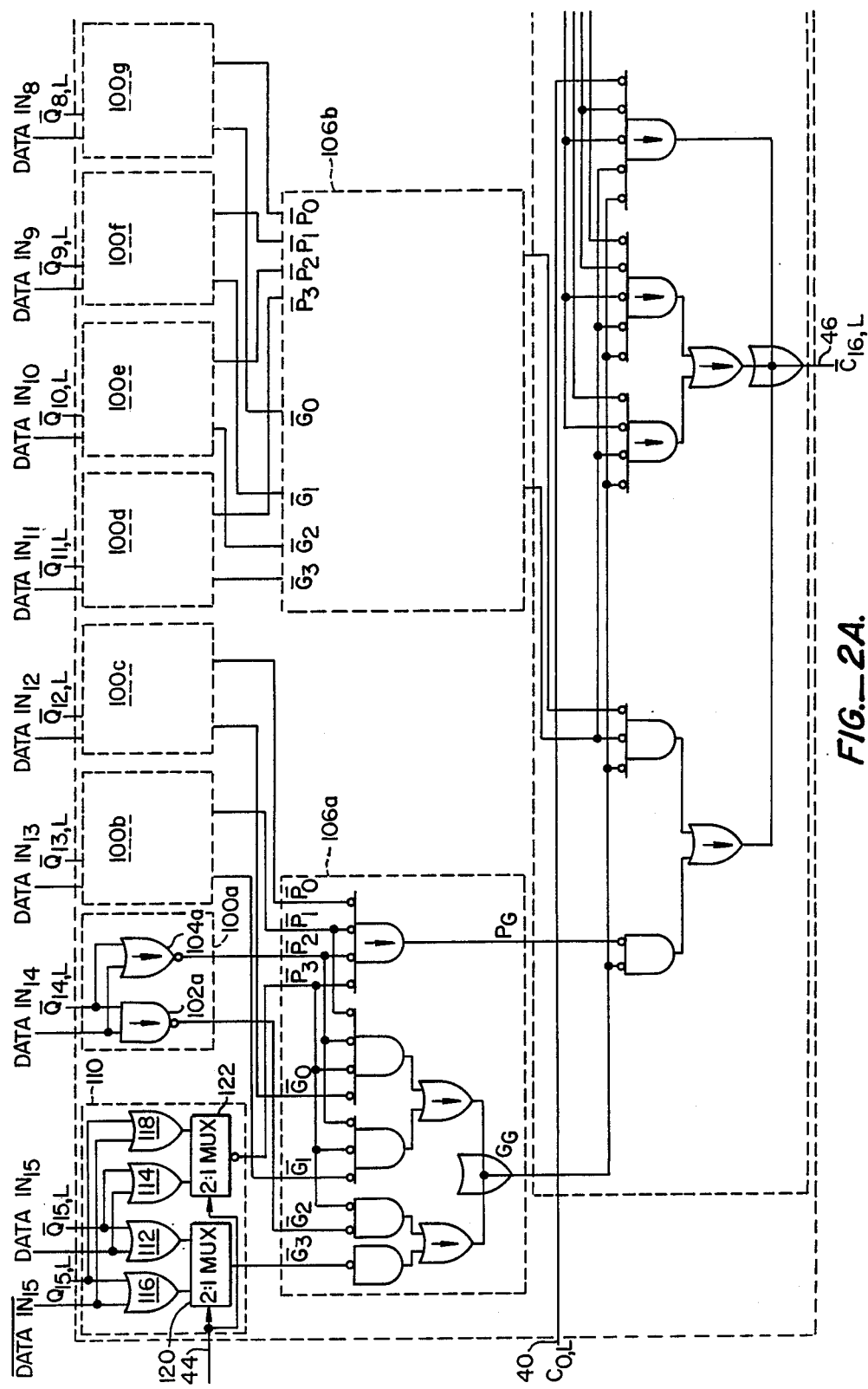
FIG._2A.

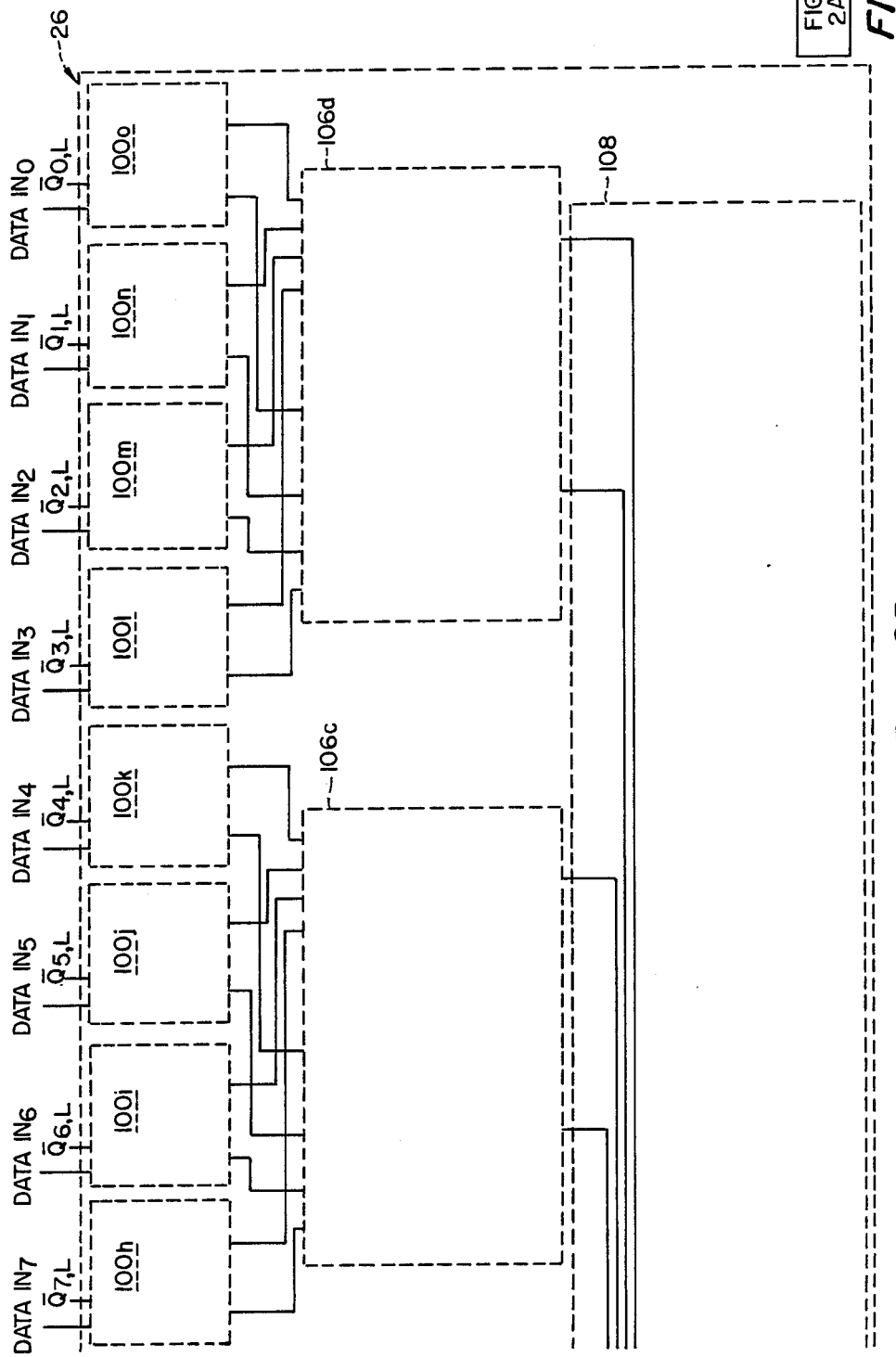

BOUNDS CHECKER

This invention relates generally to digital integrated circuitry which compares 16-bit data values against lower and upper limits and, more particularly, to a single-chip circuit which can compare numbers selectively in an unsigned mode or a signed two's complement mode without loss of speed relative to a device which operates exclusively on unsigned or exclusively on signed numbers.

BACKGROUND OF THE INVENTION

In many applications, digital data must be compared against programmable lower and upper numeric values. For example, a computer may utilize a virtual memory in which a selectable contiguous part of the virtual memory is mapped into random access memory (RAM) providing relatively faster read/write access times. Most of the instructions executed on the computer address locations within the fast RAM, however certain relatively-infrequent instructions such as load and store may address any location within the virtual memory. Hence apparatus is needed which can operate in real time to detect numeric values, here addresses, which fall outside a pair of numeric boundaries.

The prior art has constructed such bounds checker apparatus with discrete medium-scale integrated circuit (MSI) devices; in one instance, a 16-bit checker consisting of four 8-bit registers and four 8-bit comparators. This approach is undesirable for a variety of reasons; foremost among them are the cost of the individual components over that of a single-chip component and the large board area consumed by a number of individual components.

Other desirable features of the prior art discrete component approach are high power consumption, fabrication costs of interconnecting the terminal plus of the individual components, the inter-component propagation delays and the inherent lower reliability of a multichip implementation as compared with a single-chip version.

In addition, the use of individual components made each application of a bounds checker a custom designed project with the attendant design costs and debugging requirements.

SUMMARY OF THE INVENTION

The present invention provides a single-chip 16-bit bounds checker at one-third the cost of the prior art discrete component approach, using one-eighth the board space of the space used in the prior art approach. The present invention requires only one-tenth the power of the prior art bounds checkers and affects a 20 percent improvement in cycle times. Interconnection of the more than 100 pins used in the discrete approach of the prior art is considerably reduced since the single-chip bounds checker of the instant invention requires only 28 pins.

The bounds checker of the present invention can be operated in either an unsigned mode capable of processing data in the range 0 to $2^{16}-1$ or in a signed mode capable of processing data in the range $-2^{15}$ to $+2^{15}-1$. The mode is selected by a signal applied to a terminal pin of the bounds checker. A shared sixteen-bit wide input data bus receives the lower and upper limit values which are then loaded into lower and upper limit on-chip registers upon receipt of load lower and load upper signals. Data values to be compared against these limits are also presented on the shared input data bus.

A novel feature of the bounds checker provides the testing of either unsigned or signed two's complement numbers as described without imposing additional delay over a bounds checker which can operate only on one type of number.

The bounds checker of the present invention provides three outputs for presenting the results of testing a data value against the programmable lower and upper limits. At a first output a signal is a HIGH if the data value exceeds (or equals) the lower limit, at a second output a signal is a HIGH if the data value is less than (or equals) the upper limit and at a third output a signal is a LOW if the data value is strictly between (or not outside) the lower and the upper limits. The choice of whether the tests will include or not include the parenthesized portion of the tests just described is selectable by the application of suitable signals to certain of the terminal pins of the bounds checker of the present invention.

The bounds checker of the present invention is readily cascaded to provide a bounds checker capable of testing extended-precision values.

BRIEF DESCRIPTION OF THE FIGURES

FIG. 1 illustrates a 16-bit bounds checker constructed according to the teachings of the present invention.

FIG. 2 is a map illustrating how FIGS. 2A and 2B connect together.

FIGS. 2A-2B are logic diagrams of a comparator constructed according to the teachings of the present invention.

FIG. 3 illustrates two bounds checkers of the present invention interconnected to form a 32-bit bounds checker.

DESCRIPTION OF A PREFERRED EMBODIMENT

FIG. 1 illustrates an embodiment of the bounds checker 10 constructed in accordance with the teachings of the present invention. The bounds checker 10 receives 16-bit data words at a set of sixteen data input terminals DATA$\_$IN$_{0-15}$. The data input terminals are connected via a 16-bit data bus 20 to a lower bound register 22, an upper bound register 24, a lower comparator 26 and an upper comparator 28. The 16-bit data bus 20 is shared by the registers 22 and 24 and the comparators 26 and 28 so that the signals representing the 16-bit number-to-be-compared and the 16-bit numbers forming the lower and upper comparison limits can be placed onto the data input terminals of bounds checker 10 and conducted to the appropriate element therein.

The lower bound register 22 receives on signal line 30 a load lower bound register signal applied to a load lower (LOAD$_{13}$LOWER) terminal of bounds checker 10. A 16-bit signal applied to the DATA$_{13}$IN$_{0-15}$ terminal of bounds checker 10 is conducted via bus 20 to an inverted input of lower bound register 22 and upon application of the load lower bound register signal, the 16-but complemented signals are received and stored in register 22. Lower bound register 22 also receives a clock pulse applied to a clock (CLK) terminal of bounds checker 10 and conducted to register 22 via signal line 22. The 16-bit word loaded into register 22 is available at a 17-bit output of the register 22 at the arrival of the next clock pulse. The 17-bit output of register 22 will remain unchanged until the clock pulse next-following application of another load lower bound register signal.

LOWER and CARRY_IN_UPPER terminals respectively, in accordance with Table I, below.

TABLE I

Bounds Checker Operation

| Signals at Inputs | | Signals at Outputs HIGH Iff. | | |
|---|---|---|---|---|
| CARRY_IN_LOWER | CARRY_IN_UPPER | LOWER_OUT | UPPER_OUT | OUT_OF_BOUNDS |
| LOW | LOW | L < D | D < U | D ≦ L or U ≦ D |
| LOW | HIGH | L < D | D ≦ U | D ≦ L or U < D |
| HIGH | LOW | L < D | D < U | D < L or U ≦ D |
| HIGH | HIGH | L ≦ D | D ≦ U | D < L or U < D |

The 17-bit output of the lower bound register 22 consists of the (complemented) value of each of the lower-order fifteen bit complemented signals received and stored within register 22, plus the true and complemented value of the most-significant bit (msb) signal received and stored therein. The seventeen output signals are conducted via bus 34 to lower comparator 26.

In a manner similar to that described above, the upper bound register 24 receives on a signal line 36 a load upper bound register signal applied to a load upper (LOAD_UPPER) terminal of the bounds checker 10. A 16-bit signal applied to the DATA_IN$_{0-15}$ terminals of checker 10 is conducted (in true values) as described above in connection with register 22. Upon reception of the next-following clock pulse applied to the CLK terminal of bounds checker 10, the 17-bit output signals of upper bound register 24, the true value of each of the lower-order bits, plus the true and complemented value of the msb is conducted via a bus 38 to upper comparator 28.

In addition to the 17-bit signals representing the lower bound, lower comparator 26 receives a 17-bit signal comprising the 16-bit true signals on the data bus 20 and the one-bit complemented signal of the msb on the data bus 20. Similarly, in addition to the 17-bit signals representing the upper bound, upper comparator 28 receives at an inverted input the 16-bit signal on the data bus 20 and the one-bit true signal of the msb on the data bus 20.

The lower comparator 26 also receives a carry-zero-low ($C_{0,L}$) signal applied to a CARRY_IN_LOWER terminal of the bounds checker 10 and conducted therefrom via a signal line 40. Upper comparator 28 receives a carry-zero-upper ($C_{0,U}$) signal applied to a CARRY_IN_UPPER terminal of the bounds checker 10 and conducted therefrom via signal line 42. Comparators 26 and 28 also receive a signed-mode signal applied to a SIGNED terminal of the bounds checker 10 and conducted therefrom via a signal line 44.

Lower comparator 26 generates on signal line 46 a complement carry-sixteen-lower ($\overline{C_{16,L}}$) signal conducted via an inverter 47 to a LOWER_OUT terminal of bounds checker 10 and conducted to a first complemented input of an AND gate 50. Upper comparator 28 generates on signal line 48 a complement carry-sixteen-upper ($\overline{C_{16,U}}$) signal conducted via an inverter 49 to an UPPER_OUT terminal of bounds checker 10 and conducted to a second input of the AND gate 50. The inverted output of AND gate 50 is connected to an OUT_OF_BOUNDS output terminal of bounds checker 10.

The signals $\overline{C_{16,L}}$ and $\overline{C_{16,U}}$ generated at the outputs of the comparators 26 and 28, respectively are related to the $C_{0,L}$ and $C_{0,U}$ signals applied to the CARRY_IN_

With reference to Table I, the entries in the column labelled LOWER_OUT refer to the conditions which must prevail between the current contents of the lower bound register 22, denoted "L" in Table I, and the current value applied to the DATA_IN$_{0-15}$ terminals, denoted "D" in Table I, to cause a LOW $\overline{C_{16,L}}$ signal to be generated by lower comparator 26, and accordingly a HIGH $C_{16,L}$ signal to be received at the LOWER_OUT terminal of bounds checker 10. For example, in the first row, corresponding to a LOW signal at both carry-in inputs, the lower comparator 26 generates a LOW $\overline{C_{16,L}}$ signal if and only if the current contents in the lower bound register 22 is strictly less than the current value applied to the DATA_IN$_{0-15}$ terminals.

Similarly, the column labelled UPPER_OUT of Table I indicates the conditions which must prevail between "D" and the current contents of the upper bound register 24, denoted "U" therein.

The signal at the OUT_OF_BOUNDS output of bounds checker 10 is related to the signals $C_{16,L}$ and $C_{16,U}$ according to the equation:

$$\text{OUT\_OF\_BOUNDS} = \overline{\overline{C_{16,L}} \cdot \overline{C_{16,U}}} = \overline{C_{16,L}} + \overline{C_{16,U}}$$

and therefore represents the failure of either (or both) conditions which cause a HIGH signal at the LOWER_OUT or the UPPER_OUT terminals to be received, in accordance with Table I, above, as determined by the signals at the CARRY_IN_LOWER and the CARRY_IN_UPPER terminals.

The bounds checker 10 of the current invention can be selectively operated in either a signed (two's complement) mode or an unsigned mode depending on whether a HIGH, or a LOW, respectively signal is applied to the SIGNED terminal of the bounds checker. The lower and upper limit and data numbers are treated as signed 16-bit, or unsigned 16-bit integers, respectively, and the comparisons are effected in accordance with Table I, above, as determined by the signals at the CARRY_IN_LOWER and the CARRY_IN_UPPER terminals.

The bounds checker 10 implements the ability to operate on both signed and unsigned numbers in a way that extracts no additional time penalty in the cycle time of the device. During the signed mode of operation of the bounds checker 10, the value $2^{15}$ is added to all the numbers, lower and upper limits and data, to be used in the comparison operation under control of the signal applied to the SIGNED terminal and conducted via signal line 44 to the comparators 26 and 28. The addition is accomplished by complementing the most significant bit, i.e. bit position 15, of the signals received at the comparators 26 and 28 by the propagate and generate circuits of a carry lookahead logic circuit interior to the comparators 26 and 28 in a way that does not add to the combinatorial delay of the circuit.

To best understand this novel aspect of the present invention, reference should be had to FIGS. 2A-2B, which illustrate the circuitry internal to the lower comparator 26 of the bounds checker 10, (and typical of the circuitry internal to the upper comparator 28). As described above, the signals applied to the DATA—$IN_{0-15}$ terminal of the bounds checker 10 are conducted to comparator 26 together with the complement of the signal applied to the DATA—$IN_{15}$ terminal. The signal applied at the DATA—$IN_i$, i=14, 13, ..., 1, 0; terminal is conducted to an input of a respective one of a set of fifteen logic circuits 100a, 100b, ..., 100o; i.e., logic circuit 100a receives the signal applied at the DATA—$IN_{14}$ terminal, ..., logic circuit 100o receives the signal applied at the DATA—$IN_0$ terminal. The 15 complemented signals generated by the lower bound register 22, $\overline{Q_{i,L}}$, i=14, 13, ..., 1, 0; are conducted to a second input of the respective one of the set of fifteen logic circuits 100a, 100b, ..., 100o; i.e., logic circuit 100a receives the signal $\overline{Q_{14,L}}$, logic circuit 100o receives the signal $\overline{Q_{0,L}}$.

Logic circuit 100a, typical of the remaining logic circuits 100b, ..., 100o, includes a NAND gate 102a and a NOR gate 104a which each receive at a first input the signal conducted from the DATA—$IN_{14}$ terminal and at a second input the $\overline{Q_{14,L}}$ signal. Because the complement of the signal representing the contents of the lower bound register 22, is applied to the logic circuits 100a, 100b, ..., 100o along with the true signal conducted from the DATA—$IN_{0-14}$ terminals, the logic circuits perform a subtraction of the low-order fifteen bits of the lower bound from the data-value-to-be-compared through one's complement addition. The signals at the output of the NAND gate 107a of the NOR gate 104a of logic circuit 100a represent the complement of a generate and propagate signal, respectively, which is conducted to a four-bit lookahead carry circuit 106a, typical of the lookahead carry circuits 106b, 106c and 106d. The corresponding complemented generate and propagate signals generated by the logic circuits 100b and 100c are likewise conducted to lookahead carry logic circuit 106a.

The generate and propagate signals generated by the four logic circuits 100d, ..., 100g, the four logic circuits 100h, ..., 100k, the four logic circuits 100l, ..., 100o are conducted to lookahead carry circuits 106b, 106c and 106d, respectively. Generate and propagate signals generated by the four first-level carry circuits 106a, ..., 106d are conducted to a second-level lookahead carry circuit 108 which also receives the carry-zero-low ($C_{0,L}$) signal via the signal line 40. The circuitry internal to the lookahead carry circuits 106a, ..., 106d and 108 is conventional and the circuits function in a manner well known to those skilled in the art.

The operation of the above-described elements of the comparator 26 illustrated in FIGS. 2A-2B is conventional, and as mentioned, performs a one's complement addition of the low-order fifteen bits of the data-value-to-be-compared ($D_{0-14}$) and the low-order fifteen bits of the contents of the lower bound register 22 ($L_{0-14}$). The generate and propagate signals generated within the second-level lookahead carry circuit 108 are wired-OR together to form the $\overline{C_{16,L}}$ signal generated at the output of the circuit 108 and conducted via signal line 46 and inverter 47 to the LOWER—OUT terminal of the bounds checker 10. Accordingly, the carry-out signal $\overline{C_{16,L}}$ is a HIGH if either a final generate signal or a final propagate signal (or both) was generated as a result of the one's complement addition of the low-order 15 bits $D_{0-14}$ and $L_{0-14}$, as shown in Table II below. Thus the carry-out signal $\overline{C_{16,L}}$ is a LOW if neither the final generate signal, nor the final propagate signal was generated, i.e., the signal at the LOWER—OUT terminal is a HIGH if and only if the resulting subtraction produces neither a generate signal nor a propagate signal.

TABLE II

| | Lower Comparator Operation | |
|---|---|---|
| $C_{0,L}$ Carry-In Signal | Resulting Subtraction | Signal at LOWER—OUT Terminal HIGH If |
| LOW | $D_{0-14} - L_{0-14} - 1$ | $L_{0-14} < D_{0-14}$ |
| HIGH | $D_{0-14} - L_{0-14}$ | $L_{0-14} \leq D_{0-14}$ |

The first row of Table II corresponds to the situation where a LOW carry-in signal is applied to the lower comparator 26. Hence the resulting carry-out signal $\overline{C_{16,L}}$ generated by the second-level lookahead carry logic circuit 108 of comparator 26 is the carry resulting from a one's complement addition (i.e., subtraction) of the subtrahend $L_{0-14}$ and the $D_{0-14}$ values. Due to the characteristics of one's complement arithmetic the resulting value is, as shown, $D_{0-14} - L_{0-14} - 1$. Since the signal $\overline{C_{16,L}}$ is a LOW (and the signal at the LOWER—OUT terminal is a HIGH) if and only if either the final generate or the final propagate and $C_{0,L}$ are high signals, i.e., if and only if there is a carry-out of the subtraction $D_{0-14} - L_{0-14} - 1$, in other words if and only if the resulting value of $D_{0-14} - L_{0-14} - 1$ is not negative, i.e, if and only if $D_{0-14} - L_{0-14} - 1 \leq 0$, or as shown in the last column of Table II, $L_{0-14} < D_{0-14}$.

As shown in the second row of Table II, if a HIGH carry-in signal is applied to the lower comparator 26, the resulting subtraction is performed with a forced carry-in of a ONE bit, and thus corresponds to the subtraction $D_{0-14} - L_{0-14}$, and thus the resulting carry-out signal $\overline{C_{16,L}}$ is a LOW (and the signal at the LOWER—OUT terminal is a HIGH) if and only if the resulting value of $D_{0-14} - L_{0-14}$ is not negative, or as shown in the last column of Table II, $L_{0-14} \leq D_{0-14}$.

The comparisons reflected in the first and second rows of Table II, above, are in agreement with the corresponding first and second, and third and fourth respectively, rows of Table I, above.

The bounds checker 10 of the instant invention can process signed as well as unsigned lower and upper limits and data-to-be-compared values. Unsigned 16-bit values in the range 0 to $2^{16} - 1$ are treated as described above by the comparators 26 (and 28) in that the low-order fifteen bits of the lower limit, $L_{0-14}$, are subtracted from the data-value-to-be-compared, $D_{0-14}$, as described and the true and complemented signals corresponding to the most-significant bits $L_{15}$ and $D_{15}$ of the lower limit and the data-value-to-be-compared, respectively, are conducted from the lower bound register 22 and the DATA—$IN_{15}$ terminal of bounds checker 10, respectively, to a special logic circuit 110, within lower comparator 26.

Special logic circuit 110 includes a pair of OR gates 112 and 114 which each receive at a first input the signal conducted from the most-significant DATA—$IN_{15}$ terminal of the bounds checker 10 and at a second input the most-significant $\overline{Q_{15,L}}$ signal generated by the lower bound register 22. Circuit 110 also includes a pair of OR gates 116 and 118 which each receive at a first input the complemented signal conducted from the DATA_IN$_{15}$ terminal, and at a second input the most-significant Q$_{15,L}$ signal generated by the lower bound register 22.

Special logic circuit 110 also includes a pair of 2:1 multiplexers (2:1 MUX) 120 and 122 which each receive the signed-mode signal conducted on signal line 44 from the SIGNED terminal of bounds checker 10. Multiplexer 120 is connected to the outputs of the OR gates 112 and 116 and under control of the signed-mode signal conducts either the signal at the output of OR gate 112, or OR gate 116, to an output of the multiplexer 120, depending on whether the signed-mode signal is a HIGH, or a LOW, respectively. Multiplexer 122 is connected to the outputs of the OR gates 114 and 118 and under control of the signal-mode signal conducts either the signal at the output of OR gate 114, or OR gate 118, to an inverting output of the multiplexer 122, depending on whether the signed-mode signal is a LOW, or a HIGH, respectively.

The output of multiplexer 120 is connected to the most-significant inverted generate input of carry lookahead circuit 106a and the inverted output of multiplexer 122 is connected to the most-significant inverted propagate input of carry lookahead circuit 106a.

When the bounds checker 10 is being operated in its unsigned-mode a LOW is applied to the SIGNED terminal and a LOW signed-mode signal is conducted to the 2:1 MUX 120 and the 2:1 MUX 122 which causes the logical "OR" signal composed from the signals on the complemented DATA_IN$_{15}$ and the Q$_{15,L}$ input to the OR gate 116 and the logical "OR" signal composed from the signals on the DATA_IN$_{15}$ and the $\overline{Q_{15,L}}$ input to the OR gate 114 to be conducted to the most-significant generate and propagate respectively, inputs of lookahead carry circuit 106a. Thus, during the un-signed-mode of operation, the special half-adder circuit 110 generates generate and propagate signals from the most-significant bits of the lower limit L$_{15}$ and the data-value-to-be-compared D$_{15}$ in the same manner, and with no more gate delay than, as for the lower-order fifteen bits, as previously described; i.e., $$\overline{G_3} = \overline{D_{15} + L_{15}} = \overline{D_{15}} \cdot \overline{L_{15}}$$

$$\overline{P_3} = \overline{D_{15} + L_{15}}$$

i.e., the NAND operation applied to the true signal applied to the DATA_IN$_{15}$ terminal and to complement of the Q$_{15,L}$ signal, and the NOR operation applied to the same signals.

During the signed mode of operation of bounds checker 10, a HIGH signal is applied to the SIGNED terminal and a HIGH signed-mode signal is conducted to the 2:1 MUX 120 and 122, which causes the logical "OR" signal composed from the signals on the true DATA_IN$_{15}$ and the $\overline{Q_{15,L}}$ input to the OR gate 112 and the logical "OR" signal composed from the signals on the complemented DATA_IN$_{15}$ and the Q$_{15,L}$ input to the OR gate 118 to be conducted to the most-significant inverted generate and inverted propagate inputs, respectively, of lookahead carry logic circuit 106a. In this case, the complements of the signals used to generate the most-significant inverted generate and inverted propagate signals for input to circuit 106a during the unsigned mode are used to generate these inverted generate and propagate signals, i.e., $$\overline{G_3} = \overline{D_{15} + \overline{L_{15}}} = \overline{D_{15}} \cdot L_{15}$$

$$\overline{P_3} = \overline{D_{15} + L_{15}} = \overline{D_{15}} \cdot \overline{L_{15}}$$

Accordingly, during the signed mode the lower comparator 22 operates on values which are complemented in their most-significant bits for the lower limit value and the data-value-to-be-compared, with no additional gate delay when carrying out the comparison.

The bounds checker 10 is designed to operate on two's complement signed numbers in the range from $-2^{15}$ to $2^{15}-1$ representing the upper and lower limits and the data-value-to-be-compared and hence the above-described complementation effectively adds $2^{15}$ to all values to be compared during the signed mode. This addition in no way affects the outcome of the comparisons but shifts the range of signed numbers into the range 0 to $2^{16}-1$, i.e. identical with the range of unsigned numbers which can then be compared exactly as described before for unsigned numbers, in a way which imposes no combinatorial delay regardless of the mode in which the bounds checker 10 is operated.

The internal circuitry and operation of the upper comparator 28 effects the comparison by a subtraction of the data-value-to-be-compared from the contents of the upper bound register 24 in a manner entirely analogous to that just described for the lower comparator 26 and therefore no further explanation will be supplied herein.

The bounds checker 10 of the present invention can be connected with other bounds checkers 10 to provide an extended precision bounds checker. FIG. 3 illustrates the interconnection of two bounds checkers 10 to form a 32-bit bounds checker. As shown, one bounds checker 10 ("low-order checker") receives the low-order sixteen bits of the lower limit, upper limit and data-value-to-be-compared at its DATA_IN$_{0-15}$ terminals. The upper-order sixteen bits of these numbers are received at a second bounds checker 10 ("high-order checker") relabelled DATA_IN$_{16-31}$ terminals. The LOAD_LOWER, LOAD_UPPER and CLK terminals of both bounds checkers 10 are connected in parallel. The LOWER_OUT and UPPER_OUT terminals of the low-order checker 10 are connected to the CARRY_IN_LOWER and the CARRY_IN_UPPER terminals, respectively, of the upper-order checker 10. The SIGNED terminal of the lower-order checker 10 is tied to a LOW signal, and the CARRY_IN_LOWER and CARRY_IN_UPPER terminals thereof receive the C$_{0,L}$ and C$_{0,U}$ signals, respectively, of the 32-bit checker. The SIGNED terminal of the upper-order checker 310 receives the signed-mode signal of the 32-bit checker, and the LOWER_OUT, OUT_OF_BOUNDS and, UPPER_OUT terminals thereof form the output terminals of the 32-bit checker.

The parallel connection of the clock and the LOAD_LOWER and LOAD_UPPER terminals afford simultaneous loading of the lower order and upper order 16-bit portions of the 32-bit lower and upper limit values, into the respective low-order and high-order bounds checker. Tying the SIGNED terminal of the low-order bounds checker 10 to a LOW causes the special logic circuit 110 therein to affect a normal (unsigned) comparison of the lower-order portions of the lower and upper limit values against the lower-order portion of the data-value-to-be-compared. Application of the appropriate signed-mode signal to the SIGNED terminal of the high-order bounds checker 10 causes the special logic circuit 110 therein to affect either an unsigned or signed comparison by either using the normal or the complemented values of the most-significant, i.e. 31st, bits of the lower and upper limits and the data-value-to-be-compared during the subtractions performed by the comparators 26 and 28 within the upper-order bounds checker.

The $C_{16,L}$ and $C_{16,U}$ carry-out signals generated by the low-order bounds checker 10 are supplied as the $C_{0,L}$ and $C_{0,U}$ carry-in signals, respectively, to the high-order bounds checker and therefore the lower-order and high-order carry-out signals generated by the second level carry lookahead circuits of the comparators 26 and 28 within the high-order bounds checker will be correctly adjusted for any potential carries out of the low-order bounds checker 10. Accordingly, the outputs of the high-order bounds checker, LOWER_OUT, OUT_OF_BOUNDS and UPPER_OUT will reflect the correct result of the comparisons with the 32-bit upper and lower limit values against the 32-bit data-value-to-be-compared.

I claim:

1. Digital single-chip integrated circuit bounds checker means responsive to a plurality of user-selectable signals indicative of a plurality of selectable numeric relationships, and further responsive to a first plural-bit numeric data word ("data-to-be-compared"), for receiving and storing a second and a third plural-bit numeric data words ("lower-" and "upper-limits", respectively,) and for generating at a first output a signal indicative of whether said data-word-to-be-compared bears a first of said plurality of selectable numeric relationships to said lower-limit data word, at a second output a signal indicative of whether said data-word-to-be-compared bears a second of said plurality of selectable numeric relationships to said upper-limit data word, and at a third output a signal indicative of whether said data-word-to-be-compared bears a third of said plurality of selectable numeric relationship to said lower- and upper-limit data words; said bounds checker means comprising:

first and second register means for receiving said lower- and upper-limit data words, respectively, and for temporarily storing said data words;
   first and second comparator means connected to said first and said second register means, respectively, responsive to said data-word-to-be-compared, for generating at a first and a second comparator means output said signal indicative of said first and said second selectable relationship, respectively, said first and said second output of said comparator means forming said first and said second output, respectively, of said bounds checker means; and
   gate means connected to said outputs of said first and said second comparator means for generating at an output said signal indicative of said third selectable relationship, said gate means output forming said third output of said bounds checker means.

2. Bounds checker means according to claim 1 further including an input data bus connected to said first and second register means and to said first and second comparator means, wherein said first and said second register means is responsive to a first and a second load register signal, respectively, whereby a plural-bit data word can be conducted via said input data bus to said first and said second comparator means, and whereby, a plural-bit data word can be conducted via said input data bus to said first register means and said second register means, and stored therein upon application of a HIGH said first and said second load register signal, respectively.

3. Bounds checker means according to claim 1 wherein said first, respectively, said second comparator means, is responsive to a first, respectively, second, carry-in signal, comprising said plurality of user-selectable numeric relationship signals whereby said output of said comparators and said gate corresponding to said first and second, said third, respectively, selectable numeric relationship is greater-than or greater-than-or-equal-to, less-than or less-than-or-equal-to, outside the open-interval or outside the open-left-closed-right-interval or outside the closed-left-open right-interval or outside the closed-interval, respectively, depending on whether said first carry-in signal is a LOW or a HIGH, said second carry-in signal is a LOW or a HIGH, said first and said second carry-in signals are a LOW or said first carry-in signal is a LOW and said second carry-in signal is a HIGH or said first carry-in signal is a HIGH and said second carry-in signal is a LOW, or said first and said second carry-in signals are a HIGH, respectively.

4. Bounds checker means according to claim 1, wherein said first, second and third numeric data words can be in either unsigned or signed two's complement notation, and wherein said comparator means are responsive to a signed-number signal, whereby said output of said comparator means and said gate means corresponding to said selectable numeric relationship is generated for either said unsigned, or said signed, respectively, numeric data words, depending on whether said signed-number signal is a LOW, or a HIGH, respectively, in a manner which imposes no added gate delay compared to the time required by said bounds checker means capable of operating only on either said unsigned or said two's complement notation data words, exclusively.

5. Bounds checker means according to claim 4 wherein said first and said second comparator means comprises:

a first and a second plurality of low-order logic cell means receiving true and complemented signals, respectively, representing predetermined low-order bit positions of said plural-bit data-word-to-be-compared, and said complemented and true signals, respectively, representing predetermined low-order bit position of said plural-bit data word stored in said first and said second register means, respectively, for generating low-order generate (GENi) and low-order propagate (PROPi) signals therefrom, a first and a second high-order logic cell means receiving true and complemented signals, respectively, representing the high-order bit position of said plural-bit data word-to-be-compared and true and complemented signals, respectively, representing the high-order bit position of said plural-bit data word stored in said first and said second register means, respectively, and receiving said signed-number signal for generating a high-order unsigned/signed generate (GENn) signal and a high-order unsigned/signed propagate (PROPn) signal therefrom, and a first, respectively, a second lookahead carry logic means receiving said low-order generate and propagate signals and said high-order unsigned/signed generate and propagate signals, generated by said first, respectively, said second logic cells, and receiving said first, respectively, said second, carry-in signal, for generating, therefrom said signals formed at said comparator means output, wherein said first plurality of low-order logic cell means perform the following logical operations on the signals representing the complement of the bit position of said data word stored in said first register means (Li) and the bit position of said data word-to-be-compared (Di):

$GENi = \overline{Li} \cdot Di$ $PROPi = Li + Di$ wherein said first high-order logic cell means performs the following logical operations on the signals representing the true and complement of the high-order bit position of said data-word-to-be-compared (Dn, $\overline{Dn}$) and the high-order true and complemented bit position of said data word stored in said first register means, (Ln, $\overline{Ln}$);

$GENn = Ln \cdot \overline{Dn}$ if signed-number signal is HIGH $GENn = \overline{Ln} \cdot Dn$ if signed-number signal is LOW $PROPn = Ln + \overline{Dn}$ if signed-number signal is HIGH $PROPn = \overline{Ln} + Dn$ if signed-number signal is LOW, wherein said second plurality of low-order logic cell means perform the following logical operations on the signals representing the complement of the bit position of said data-word-to-be-compared ($\overline{Di}$) and the bit position of said data word stored in said second register means (Ui):

$GENi = Ui \cdot \overline{Di}$ $PROPi = Ui + \overline{Di}$ and wherein said second high-order logic cell means performs the following logical operations on the signals representing the high-order true and complemented bit position of said data-word-to-be-compared (Dn, $\overline{Dn}$) and the high-order true and complemented bit position of said data word stored in said second register means (Un, $\overline{Un}$);

$GENn = \overline{Un} \cdot Dn$ if signed-number signal is a HIGH $GENn = Un \cdot \overline{Dn}$ if signed-number signal is a LOW $PROPn = \overline{Un} + Dn$ if signed-number signal is a HIGH $PROPn = Un + \overline{Dn}$ if signed-number signal is a LOW, whereby, said first comparator means performs a subtraction of said data word stored in said first register means from said data-word-to-be-compared using said first carry-in signal as the input to the least significant bit position to said first lookahead-carry logic means, a HIGH output signal thereof indicative of said first numeric relationship that said data word stored in said first register means is less than, respectively, less-than-or-equal-to, said data-word-to-be-compared, if said first carry-in signal is a LOW, respectively a HIGH, a LOW output signal thereof indicative of said first numeric relationship that said data word stored in said register means is greater-than-or-equal-to, respectively, greater-than, said data-word-to-be-compared, if said first carry-in signal is a LOW, respectively, a HIGH and whereby, said second comparator means performs a subtraction of said data-word-to-be-compared from said data word stored in said second register means using said second carry-in signal as the input to the least-significant bit position to said second lookahead carry logic means, a HIGH output signal thereof indicative of said second numeric relationship that said data word stored in said second register means is greater-than-or-equal-to, respectively, greater than, said data-word-to-be-compared, if said second carry-in signal is a HIGH, respectively, a LOW, a LOW output signal thereof indicative of said second numeric relationship that said data word stored in said second register means is less-than, respectively, less-than-or-equal-to, said data-word-to-be-compared, if said second carry-in signal is a HIGH, respectively, a LOW.

6. Digital single-chip integrated circuit bounds checker means which operates on first, second and third unsigned or signed two's complement notation numeric data words responsive to a plurality of user-selectable signals indicative of a plurality of selectable numeric relationships and further responsive to a first plural-bit numeric data word ("data-to-be-compared") and a signed-number signal for receiving and storing a second and a third plural-bit numeric data word ("lower-" and "upper-limits," respectively) and for generating at a first output a signal indicative of whether said data-word-to-be-compared bears a first of said plurality of selectable relationship to said lower-limit data word, at a second output a signal indicative of whether said data-word-to-be-compared bears a second of said plurality of selectable numeric relationship to said upper limit data word, and at a third output a signal indicative of whether said data-word-to-be-compared bears a third of said plurality of of selectable numeric relationship to said lower- and upper-limit data words, comprising:

an input data bus;

first and second register means connected to said input data bus, responsive to a first, respectively, a second, load register means for receiving said lower-, respectively, said upper-limit data words conducted thereto via said bus and for temporarily storing said data words in response to said load register signals;

a first and second plurality of low-order logic cell means connected to said input data bus and connected to said first, said second, register means, respectively, responsive to said data-word-to-be-compared conducted thereto via said bus, each said first low-order logic cell means, respectively, each said second low-order logic cell means, receiving true signals representing predetermined low-order bit positions of said plural-bit data-word-to-be-compared and signals representing predetermined low-order bit positions of said plural-bit data word stored in said first, said second, register means, respectively, for generating low-order generate (GENi) and low-order propagate (PROPi) signals therefrom;

a first and a second high-order logic cell means connected to said input data bus and connected to said first, said second, register means, respectively, responsive to said data-word-to-be-compared conducted thereto via said bus, said first high-order logic cell means, respectively, said second high-order logic cell means, receiving a true and a complemented signal representing the high-order bit position of said plural-bit data-word-to-be-compared and a signal representing the high-order bit position of said plural-bit data word stored in said first, said second, register means, respectively, and receiving said signed-number signal for generating a high-order unsigned/signed generate (GENn) signal and a high-order unsigned/signed propagate (PROPn) signal therefrom;

a first and a second lookahead carry logic means receiving said low-order generate and propagate signals and said high-order unsigned/signed generate and propagate signals, for generating therefrom at said first, respectively, said second, output of said bounds checker means, said signal indicative of said first, respectively, said second, selectable relationship; and gate means connected to said first and said second lookahead carry logic means receiving said signals indicative of said first and said second selectable relationships, for generating therefrom at said third output of said bounds checker means said signal indicative of said third selectable relationship;

whereby said lower-, respectively upper-limit, plural-bit data word can be conducted via said input data bus to said first register means, respectively, said second register means, and stored therein upon application of a HIGH said first, respectively, said second, load register signal; and whereby said signals formed on said first, second and third outputs of said bounds checker means corresponding to said selectable numeric relationship is generated for either said unsigned, or said signed, respectively, numeric data words depending on whether said signed-number signal is a LOW, or a HIGH, respectively, in a manner which imposes no added time delay compared to the time required by said bounds checker means capable of operating only on either said unsigned or said two's complement notation data words, exclusively.

7. Bounds checker means according to claim 6 wherein said first, said second, lookahead carry logic means is further responsive to a first, respectively, a second, carry-in signal comprising said plurality of user-selectable relationship signals and wherein said first plurality of low-order logic cell means perform the following logical operations on the signals representing the bit position of said data-word-to-be-compared (Di) and the complement of the bit position of said data word stored in said first register means, ($\overline{Li}$):

$GENi = Di \cdot \overline{Li}$ $PROPi = Di + \overline{Li};$ wherein said second plurality of low-order logic cell means perform the following logical operations on the signals representing the complement of the bit position of said data-word-to-be-compared ($\overline{Di}$) and the bit position of said data word stored in said second register means (Ui):

$GENi = Ui \cdot \overline{Di}$ $PROPi = Ui + \overline{Di},$ wherein said first high-order logic cell means performs the following logical operations on the signals representing the high-order true and complemented bit position of said data-word-to-be-compared (Dn, $\overline{Dn}$) and the high-order true and complemented bit position of said data word stored in said first register means (Ln, $\overline{Ln}$);

$GENn = \overline{Dn} \cdot Ln$ if signed-number signal is a HIGH $GENn = Dn \cdot \overline{Ln}$ if signed-number signal is a LOW $PROPn = \overline{Dn} + Ln$ if signed-number signal is a HIGH $PROPn = Dn + \overline{Ln}$ if signed-number signal is a LOW, wherein said second high-order logic cell means performs the following logical operations on the signals representing the high-order true and complemented bit position of said data-word-to-be-compared (Dn, $\overline{Dn}$) and the high-order true and complemented bit position of said data word stored in said second register means (Un, $\overline{Un}$);

$GENn = \overline{Un} \cdot Dn$ if signed-number signal is a HIGH $GENn = Un \cdot \overline{Dn}$ if signed-number signal is a LOW $PROPn = \overline{Un} + Dn$ if signed-number signal is a HIGH $PROPn = Un + \overline{Dn}$ if signed-number signal is a LOW, whereby, said bounds checker means performs a subtraction of said data word stored in said first register means from said data-word-to-be-compared using said first carry-in signal as the input to the least-significant bit position to said first lookahead carry logic means generating therefrom a HIGH output signal at said first output of said bounds checker means indicative of said first numeric relationship that said data word stored in said register means is less-than, respectively, less-than-or-equal-to, said data-word-to-be-compared, if said first carry-in signal is a LOW, respectively, a HIGH, said generating therefrom a LOW output signal indicative of said first numeric relationship that said data word stored in said first register means is greater-than-or-equal-to, respectively, greater-than, said data-word-to-be-compared, if said first carry-in signal is a LOW, respectively, a HIGH; and whereby, said bounds checker means performs a subtraction of said data-word-to-be-compared from said data word stored in said second register means using said second carry-in signal as the input to the least-significant bit position to said second lookahead carry logic means generating therefrom a HIGH output signal at said second output of said bounds checker means indicative of said second numeric relationship that said data word stored in said second register means is greater-than-or-equal-to, respectively, greater-than, said data-word-to-be-compared, if said second carry-in signal is a HIGH, respectively, a LOW, and generating therefrom a LOW output signal indicative of said second numeric relationship that said data word stored in said second register means is less-than, respectively, less-than-or-equal-to, said data-word-to-be-compared, if said second carry-in signal is a HIGH, respectively, a LOW, and whereby, a HIGH output signal is generated at said third output of said bounds checker indicative of said third numeric relationship that said data-word-to-be-compared is less-than-or-equal-to, respectively, less-than, said data word stored in said first register means if said first carry-in signal is a LOW, respectively, a HIGH, or that said data-word-to-be-compared is greater-than, respectively, greater-than-or-equal-to, said data word stored in said second register means, if said second carry-in signal is a HIGH, respectively, a LOW and generating at said third output, a LOW output signal indicative of said third numeric relationship that said data-word-to-be-compared is greater-than, respectively, greater-than-or-equal-to, said data word stored in said first register means if said first carry-in signal is a LOW, respectively, a HIGH, and that said data word stored in said second register means is greater-than-or-equal-to, respectively, greater-than, said data-word-to-be-compared, if said second carry-in signal is a HIGH, respectively, a LOW.

* * * * *